United States Patent [19]

Pepsnik

[11] Patent Number: 5,055,960
[45] Date of Patent: Oct. 8, 1991

[54] CASSETTE TRANSPORT DIAGNOSTIC TOOL

[76] Inventor: Howard J. Pepsnik, 40994 Gibbel Rd., Hemet, Calif. 92343

[21] Appl. No.: 342,072

[22] Filed: Apr. 21, 1989

[51] Int. Cl.⁵ .............................................. G11B 23/02
[52] U.S. Cl. .................... 360/132; 242/199; 360/137
[58] Field of Search ............... 360/132, 128, 137; 242/197–200

[56] References Cited

U.S. PATENT DOCUMENTS 4,337,909  7/1982  Harja ........................ 360/132 X

*Primary Examiner*—A. J. Heinz
*Attorney, Agent, or Firm*—Loyal M. Hanson

[57] ABSTRACT

A device for use in diagnosing a cassette transport includes a shell having a size and shape enabling it to be inserted into a cassette transport in place of a tape cassette configured for use with the cassette transport. The shell has no tape, reels, or moving parts and it is so configured that when it is inserted into the cassette transport it actuates switches that are part of the cassette transport which the tape cassette actuates when the tape cassette is inserted into the cassette transport. That enables the cassette transport to function while still leaving components of the cassette transport accessible to a technician.

16 Claims, 1 Drawing Sheet

U.S. Patent  Oct. 8, 1991  5,055,960
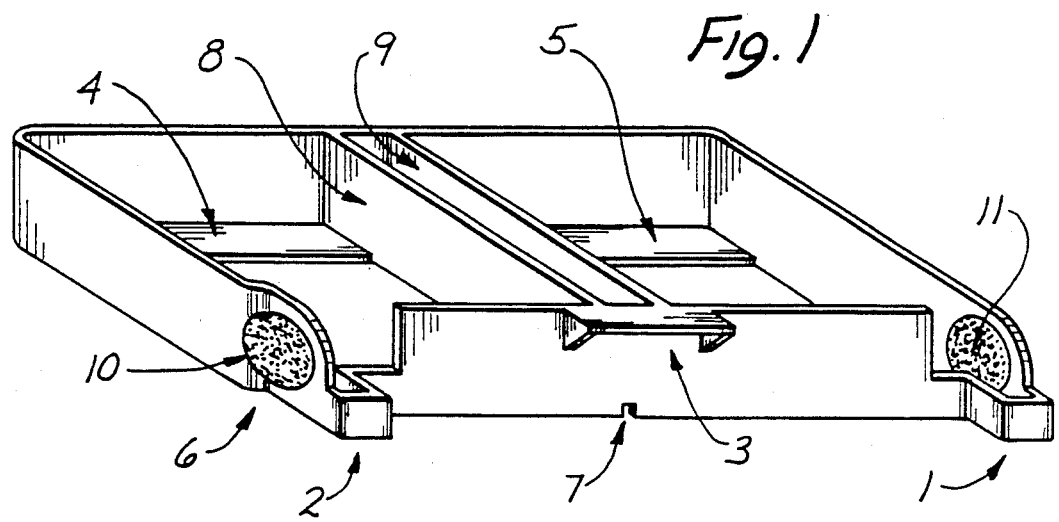
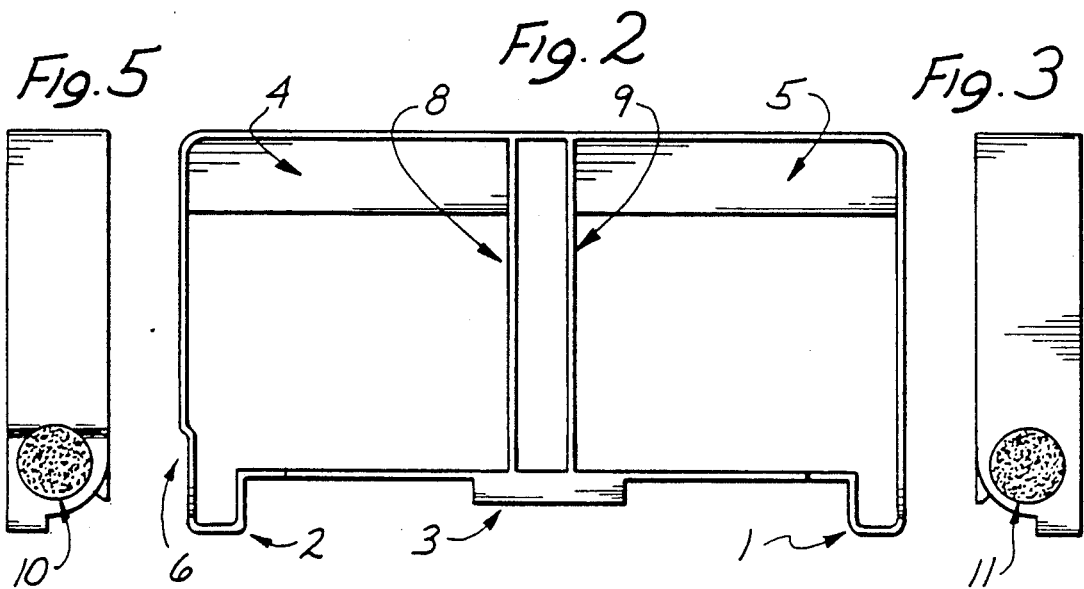
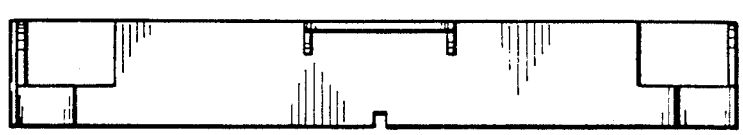

CASSETTE TRANSPORT DIAGNOSTIC TOOL

BACKGROUND OF THE INVENTION

1. Field of the Invention

This invention relates to a clear plastic device which will simulate a video cassette and allow a VCR technician to rapidly diagnose mechanical and electronic problems within a VCR with minimal disassembly of the unit. It will enable a VCR to function in all modes and still have the mechanism accessible both visually and manually for the purpose of inspection, measurement and adjustment.

2. Description of Prior Art

Up to now methods of servicing a VCR is much left to the technician's imagination an inventiveness, such as blocking sensors with black tape or holding or taping safety switches, removing video cassette transport housing then inserting a video cassette or altering a video cassette to accomplish the above. Altering a video cassette still leaves much to be desired. All VCR's have built-in safety devices to prevent damage to the video tape. Because of those safety measures it becomes necessary to have a device which will quickly bypass sensors, activate switches and release video cassette transport housing locking mechanisms. Due to the wide variety of VCR's in use a way to enable any VCR to operate without a video cassette in place would be an advantage. Loading posts, video heads, control track heads, erase head, capstan shaft, pinch roller, take-up and supply spindles, tension belt plus other mechanical and electronic parts are fully accessible both visually and manually due to the open design of this clear plastic device. This invention eliminates the problem of enabling a VCR to operate without a video cassette in place.

SUMMARY OF THE INVENTION

This invention relates to a clear plastic device which will simulate a normal video cassette. The VCR can then be operated in various modes without blocking view and access to the mechanism thus making diagnosis much easier.

It is the object of this invention to provide the service technician with an inexpensive device to save time and increase productivity. A further object is to provide a valuable training aid.

BRIEF DESCRIPTION OF THE DRAWINGS

FIG. 1 is a plan view showing an embodiment of the VCR Diagnostic tool.

FIG. 2 is an elevation view of the embodiment of the VCR Diagnostic Tool.

FIG. 3 is a right side view of the embodiment showing tape start sensor blocking label of the VCR Diagnostic Tool.

FIG. 4 is a back view of the embodiment of the VCR Diagnostic Tool.

FIG. 5 is a left side view of the embodiment showing tape end sensor blocking label of the VCR Diagnostic Tool.

DESCRIPTION OF THE PREFERRED EMBODIMENT

Referring to FIGS. 1,2,3,4, and 5 an embodiment of the invention is shown. It is a clear plastic device which will simulate a video cassette when inserted into a VCR will enable the VCR to function in all modes such as play, fast forward, rewind, cue review and pause.

1 and 2 are video cassette transport housing lock releases. All VCR's have locking mechanisms located at the front left and right sides of where the video cassette is inserted to insure the video cassette is square in the transport housing, if the video cassette is inserted other then as VCR design allows, the transport housing will not function. 3 is a switch activating lip, some VCR's have a switch located at the top center front of the video cassette transport housing, this lip activates that switch and allows the transport housing to function. 4 and 5 are video cassette down detector switch activating plates, some VCR's have a switch corresponding to 4 or 5, this switch must be activated to enable the VCR to function. 6 is clearance for lid opening lever, all video cassettes have a lid at the front end to protect the video tape within. All VCR's have a lid opening lever located at 6 to automatically unlatch the lid while the video cassette is loading into the VCR, this clearance is provided to avert possible damage to the lid opening lever. 7 is a centering notch, all VCR's have a centering finger located at 7. All video cassette's have a centering notch located at 7, again to insure the video cassette is inserted as design allows. 8 and 9 are structure strengthening walls. 10 and 11 are black self adhesive removable labels because this device is clear plastic a way to block tape start and tape end sensors must be provided, the black labels affixed as shown accomplish this purpose yet can be removed for certain diagnosing purposes. All video cassettes have a clear plastic leader spliced at either end of the actual video tape. All VCR's have a photo-electric method of detecting when the video tape within the cassette is at either extreme. A normally functioning VCR will then stop when the tape is at either end Thus with all of the conditions above satisfied a normally working VCR will operate.

I claim:

1. A device for use in diagnosing a cassette transport, the device comprising:

a shell having a size and shape enabling it to be inserted into a cassette transport in place of a tape cassette that is configured for use with the cassette transport;

the shell being without the tape, reels, and other moving parts of a conventional tape cassette; and the shell being so configured that when it is inserted into the cassette transport it actuates switches that are part of the cassette transport which the tape cassette actuates when the tape cassette is inserted into the cassette transport, in order thereby to enable the cassette transport to function while still leaving components of the cassette transport accessible to a technician;

wherein the shell has a size and shape enabling it to be inserted into the cassette transport of a video cassette recorder in place of a video tape cassette.

2. A device as recited in claim 1, wherein the shell is at least partially transparent.

3. A device as recited in claim 1, wherein the shell is composed of a plastic material.

4. A device as recited in claim 1, wherein the shell is configured to defeat at least one mechanical interlock switch that is part of the cassette transport which the tape cassette defeats when the tape cassette is inserted into the cassette transport.

5. A device as recited in claim 1, wherein the shell is configured to mechanically actuate at least one electrical switch that is part of the cassette transport which the tape cassette actuates when the tape cassette is inserted into the cassette transport.

6. A device for use in diagnosing a cassette transport, the device comprising:
   a shell having a size and shape enabling it to be inserted into a cassette transport in place of a tape cassette that is configured for use with the cassette transport;
   the shell being without the tape, reels, and other moving parts of a conventional tape cassette; and
   the shell being so configured that when it is inserted into the cassette transport it actuates switches that are part of the cassette transport which the tape cassette actuates when the tape cassette is inserted into the cassette transport, in order thereby to enable the cassette transport to function while still leaving components of the cassette transport accessible to a technician;
   wherein the shell is configured to actuate a photoelectric switch that is part of the cassette transport which the tape cassette actuates when the tape cassette is inserted into the cassette transport.

7. A device as recited in claim 6, wherein the shell includes portions configured to block tape start and tape end sensors that are part of the cassette transport which the tape cassette blocks when the tape cassette is inserted into the cassette transport.

8. A tool to simulate a normal tape cassette for the purpose of diagnosing malfunctions within a cassette transport, the tool comprising:
   a shell without the tape, reels, and other moving parts of a normal tape cassette;
   the shell having a size and shape sufficiently similar to a normal tape cassette to activate contact switches and release locking devices of a cassette transport in order to enable the cassette transport to operate as though a normal tape cassette were in place;
   whereby said tool when inserted into a cassette transport enables the cassette transport to function in all modes, while leaving components of the cassette transport accessible for inspection, measurement, and adjustment;
   wherein the shell has a size and shape enabling it to be inserted into the cassette transport of a video cassette recorder in place of a video tape cassette.

9. A device as recited in claim 8, wherein the shell is at least partially transparent.

10. A device as recited in claim 8, wherein the shell is composed of a plastic material.

11. A device as recited in claim 8, wherein the shell is configured to defeat at least one mechanical interlock switch that is part of the cassette transport which the tape cassette defeats when the tape cassette is inserted into the cassette transport.

12. A device as recited in claim 8, wherein the shell is configured to mechanically actuate at least one electrical switch that is part of the cassette transport which the tape cassette actuates when the tape cassette is inserted into the cassette transport.

13. A tool to simulate a normal tape cassette for the purpose of diagnosing malfunctions within a cassette transport, the tool comprising:
   a shell without the tape, reels, and other moving parts of a normal tape cassette;
   the shell having a size and shape sufficiently similar to a normal tape cassette to activate contact switches and release locking devices of a cassette transport in order to enable the cassette transport to operate as though a normal tape cassette were in place;
   whereby said tool when inserted into a cassette transport enables the cassette transport to function in all modes, while leaving components of the cassette transport accessible for inspection, measurement, and adjustment;
   wherein the shell is configured to actuate a photoelectric switch that is part of the cassette transport which the tape cassette actuates when the tape cassette is inserted into the cassette transport.

14. A device as recited in claim 13, wherein the shell includes at least one portion configured to block tape start and tape end sensors that are part of the cassette transport which the tape cassette blocks when the tape cassette is inserted into the cassette transport.

15. A device as recited in claim 14, wherein the portion configured to block tape start and tape end sensors includes at least one self adhesive member of opaque material affixed to the shell.

16. A tool to simulate a normal video cassette for the purpose of diagnosing malfunctions within a video cassette recorder wherein said tool is basically a shell comprised of clear plastic; said tool has no tape, reels, or moving parts; said tool is substantially the same size and shape as the normal video cassette so as to have only essential surfaces so that the video cassette recorder will operate as though a normal video cassette were in place and will activate cassette holder assembly, contact switches, and release locking devices whereby said tool when inserted into a video cassette recorder will enable the machine to function in all modes, but leave the mechanism accessible for inspection, measurement, and adjustment.

* * * * *